United States Patent [19]

Ott et al.

[11] Patent Number: 5,160,569
[45] Date of Patent: Nov. 3, 1992

[54] TOOL FOR PREPARING OPTICAL RIBBONS

[75] Inventors: Michael J. Ott, Taylorsville; Jeffrey T. Bazemore, Hickory, both of N.C.; Mark E. Brogley, Lacey, Wash.

[73] Assignee: Siecor Corporation, Hickory, N.C.

[21] Appl. No.: 742,415

[22] Filed: Aug. 8, 1991

[51] Int. Cl.⁵ ............................................. B32B 5/00
[52] U.S. Cl. ................................. 156/439; 65/4.2; 156/179; 269/909
[58] Field of Search .................. 65/1, 11.1, 181, 4.3, 65/152, 156, 4.2; 156/178, 179, 433, 439; 269/60, 902, 903, 909

[56] References Cited

U.S. PATENT DOCUMENTS

| | | |
|---|---|---|
| 3,920,432 | 11/1975 | Smith . |
| 3,976,463 | 8/1976 | Pei .............................. 65/156 |
| 4,102,561 | 7/1978 | Hawk et al. ................. 385/59 |
| 4,149,072 | 4/1979 | Smith et al. ................. 385/53 |
| 4,289,558 | 9/1981 | Eichenbaum et al. ...... 156/179 |
| 4,490,202 | 12/1984 | Dumont ...................... 156/433 |
| 4,529,265 | 7/1985 | Toya et al. .................. 385/71 |
| 4,737,215 | 4/1988 | Stoffels et al. .............. 156/433 |
| 4,900,126 | 2/1990 | Jackson et al. .............. 385/114 |
| 4,980,007 | 12/1990 | Ferguson ..................... 156/178 |
| 4,980,012 | 12/1990 | Nieda et al. ................. 156/433 |

Primary Examiner—Robert L. Lindsay
Attorney, Agent, or Firm—J. David Abernethy

[57] ABSTRACT

Disclosed is a fiber organizing tool having a frame with a channel with narrow raised sidewalls for piercing an adhesive tape to be laid on fibers laid straight in the channel. The optical fibers are arranged in a narrow slot in a member hingedly mounted to the frame.

1 Claim, 3 Drawing Sheets

FIG. I

TOOL FOR PREPARING OPTICAL RIBBONS

BACKGROUND OF THE INVENTION

The invention is a device for ribbonizing optical fibers, also known as light waveguide fibers.

Various devices have been used in the past for ribbonizing optical fibers. One such device is disclosed in U.S. Pat. No.3,920,432, assigned to Bell Labs.

Because devices are now contemplated to splice optical fiber ribbons to each other, devices are also now needed which can be used in an outdoor environment to quickly and safely ribbonize a number of loose optical fibers.

SUMMARY OF THE INVENTION

The present invention is a simple ribbonizing tool which does not require adhesive sprays and can be used by craftspersons. An organization member is mounted on a frame having a channel therein for holding parallel optical fibers. The optical fibers are organized to be parallel in an organization member hingedly mounted to the frame. The optical fibers are placed in succession into a slot in the organization member whose width is greater than the diameter of the optical fibers but less than twice such diameter. The organization member is then lowered to a first position wherein the slot, and, therefore, the optical fibers held thereby, are parallel to the channel. After the optical fibers are laid in the channel an adhesive tape is applied over the channel, a pair of narrow rigid sidewalls extending slightly from the channel cutting the edges of the tape in the process. The tape and the optical fibers adhering thereto can then be removed from the channel.

BRIEF DESCRIPTION OF THE DRAWINGS

The detailed description of the preferred embodiment is made with respect to the drawings, in which.

DETAILED DESCRIPTION OF THE PREFERRED EMBODIMENT

Figure 1:
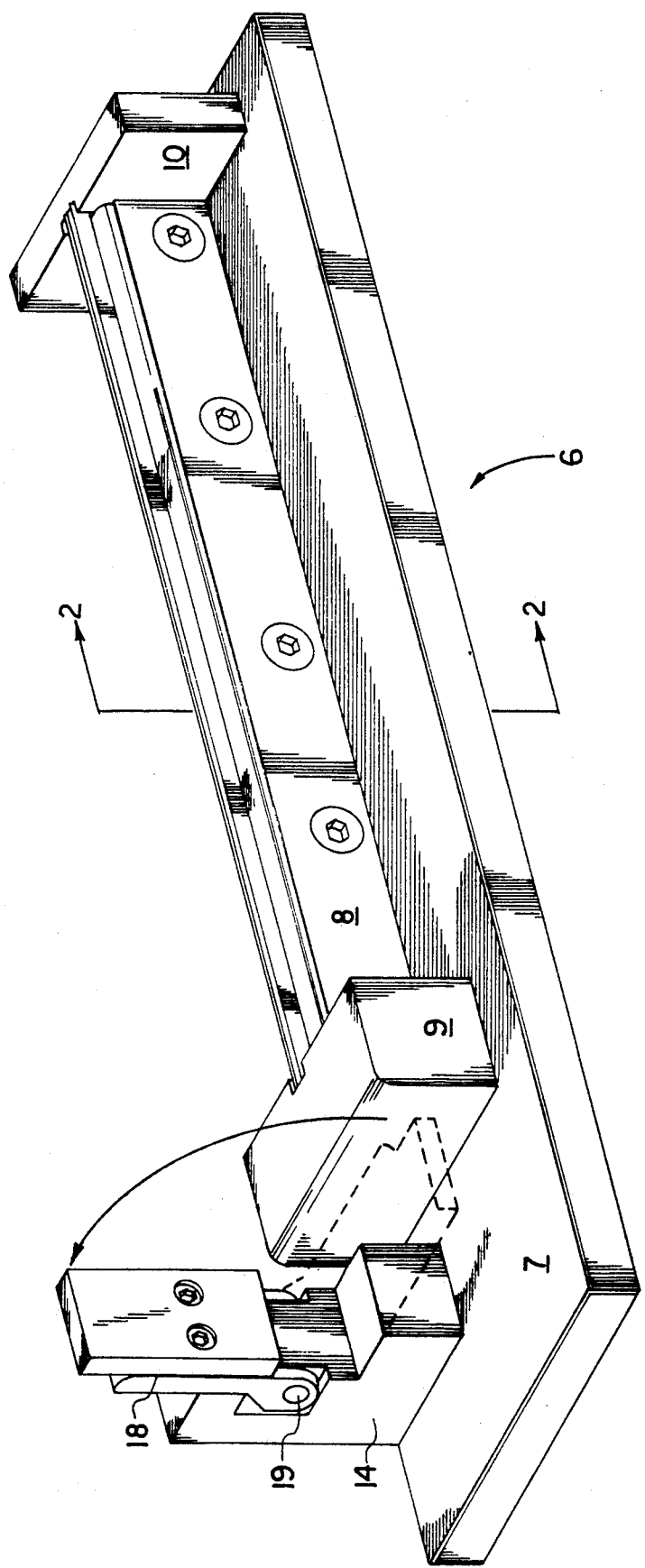
FIG. 1 is a perspective view of the tool with the organizer in the second position.
Figure 2:
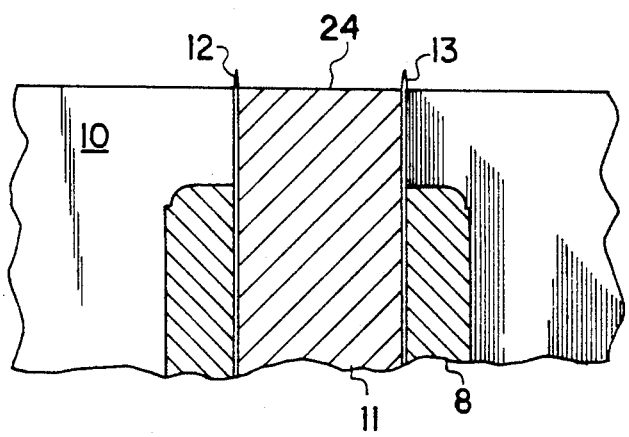
FIG. 2 is an enlarged sectional view of the channels and sidewalls therefor.

Optical fiber organizing tool 6 as shown in FIG. 1 includes organization member 16 mounted on hinge 19 to a frame including base 7, end blocks 9 and 10 mounted on base 7, bar 8 mounted on base 7 between blocks 9 and 10, and organization member mount 14 which is mounted on base 7. Organization member 16 is shown in the second position in FIG. 1 and can rotate as shown from the first position, shown by dashed lines, to the second position as shown. Bar 8 has a channel 24 on the upper surface thereof set between a pair of narrow rigid sidewalls 12, 13 which extend slightly from channel 24 for the purpose of severing tape as later described.

Figure 3:
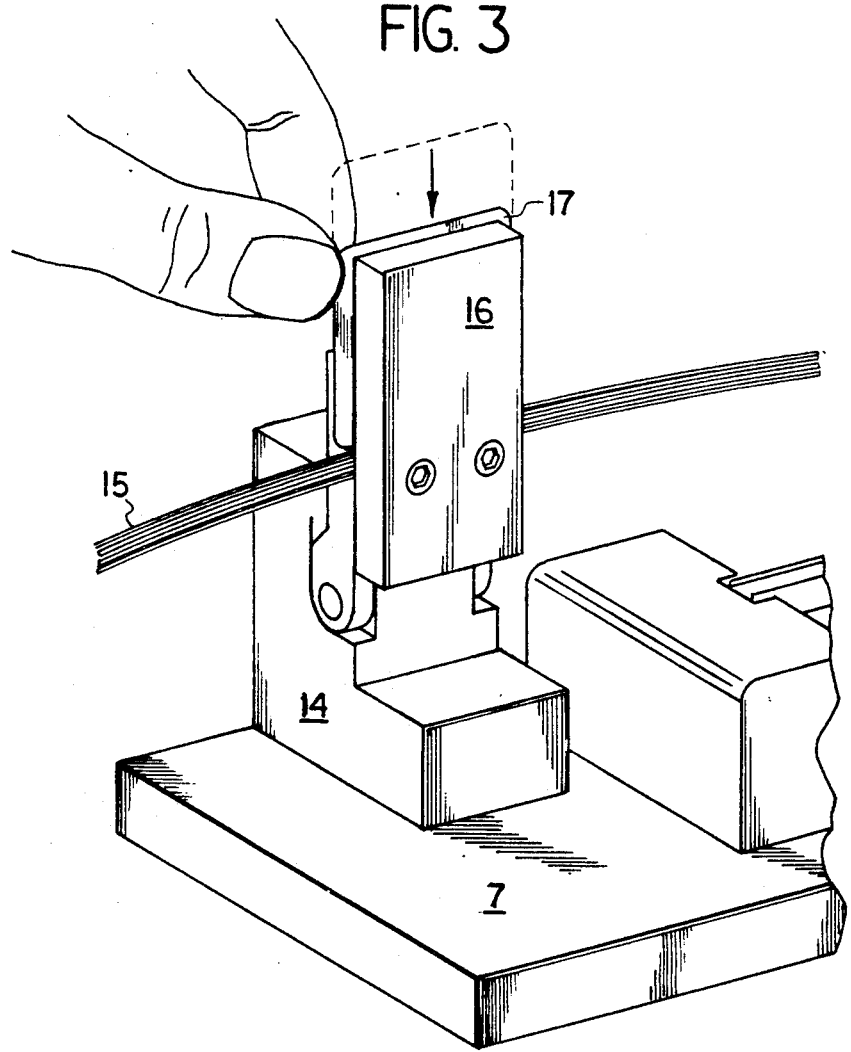
FIG. 3 is a detailed view of optical fibers being laid parallel in the organizer.

Optical fiber organizing tool 6 may be used to ribbonize separate optical fibers from non-ribbonized cables. As shown in FIG. 3, separate optical fibers 15 are placed in slot 18 of organization member 16. Slot 18 has a width greater than the diameter of the optical fibers to be organized, but such width is less than twice the diameter of the optical fibers to be organized. Thus, it is impossible for optical fibers 15 to form anything other than a vertical arrangement to be desired for the use of this tool. A shim 17 is then inserted into slot 18 to place optical fibers 15 in a touching, side-by-side relation. The craftsman then places all of optical fibers 15 between a thumb and forefinger and the fingers are moved away from the organization member in the direction of the channel to eliminate fiber crossover. Next, the craftsperson uses the other hand to pull all of optical fibers 15 back through slot 18 until only approximately one inch of optical fibers 15 protrude from slot 18 in the direction of channel 24. While maintaining a grasp of optical fibers 15 between the thumb and forefinger, maintaining their order and their side-by-side position, organization member 16 is lowered to its first, horizontal position as shown by the dashed lines in FIG. 1 and as shown in FIG. 4.

The craftsperson next gently pulls optical fibers 15 through slot 18 and across the length of channel 24. Pulling stops when the terminal ends of optical fibers 15 hang over the further end of block 10. Optical fibers 15 are now resting within channel 24, in order and free from crossovers or tangles.

The craftsman then carefully places a finger on the optical fibers 15 adjacent to block 9. A one inch piece of tape is then placed across optical fibers 15 on block 9. The use of Scotch Brand A10 Magic TM tape ($\frac{3}{4}"\times 96"$) is a suitable tape to be used in this and later steps.

Figure 4:
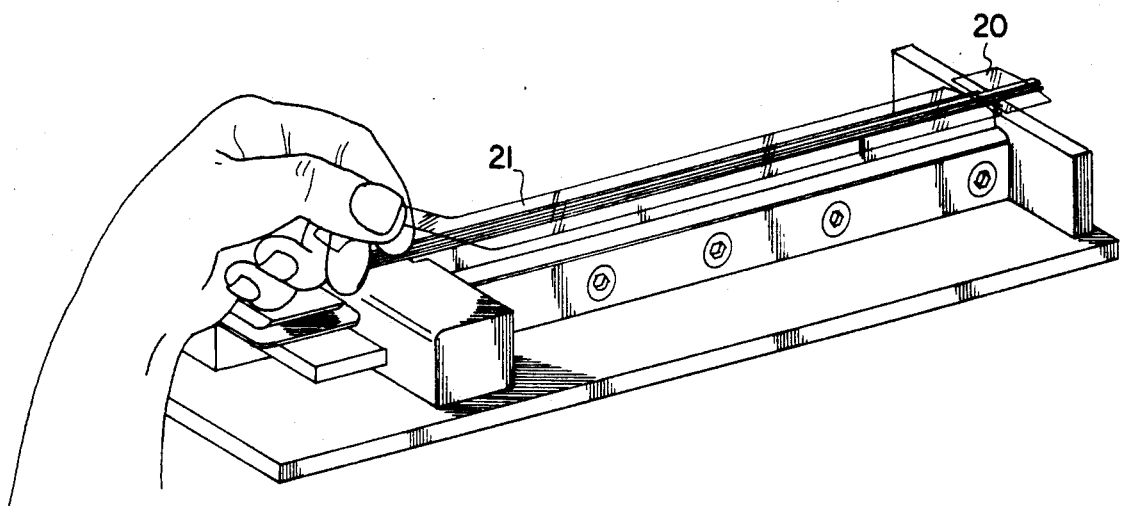
FIG. 4 is a perspective view of the tool with the organizer in the first position and tape being applied to the optical fibers in the channel; and, FIG. 5 is a detailed perspective view showing the ribbonized optical fibers being removed from the tool.

After checking to see if the fibers are still properly within the channel, a second one inch piece of tape 20 is placed over optical fibers 15 on block 10 as shown in FIG. 4. Six inches of tape 21 are then placed over optical fibers 15 in channel 24, beginning at the edge of block 10. Tape 21 must stay centered on channel 24. A finger is then gently rubbed along the top of channel 24 to assure even and smooth application of tape over the aligned optical fibers, rubbing several times with increasing pressure as necessary. Tape 21 will begin to fold over sidewalls 13, 12 and adhere to the sides of bar 8 as the downward pressure of the finger increases. The fingers are then run along the outside surfaces of sidewalls 12, 13 to insure tape 21 is smoothly folded over sidewalls 12, 13 and adhering to their outside surfaces. Tape 21 must lie smoothly with no wrinkles.

Figure 5:
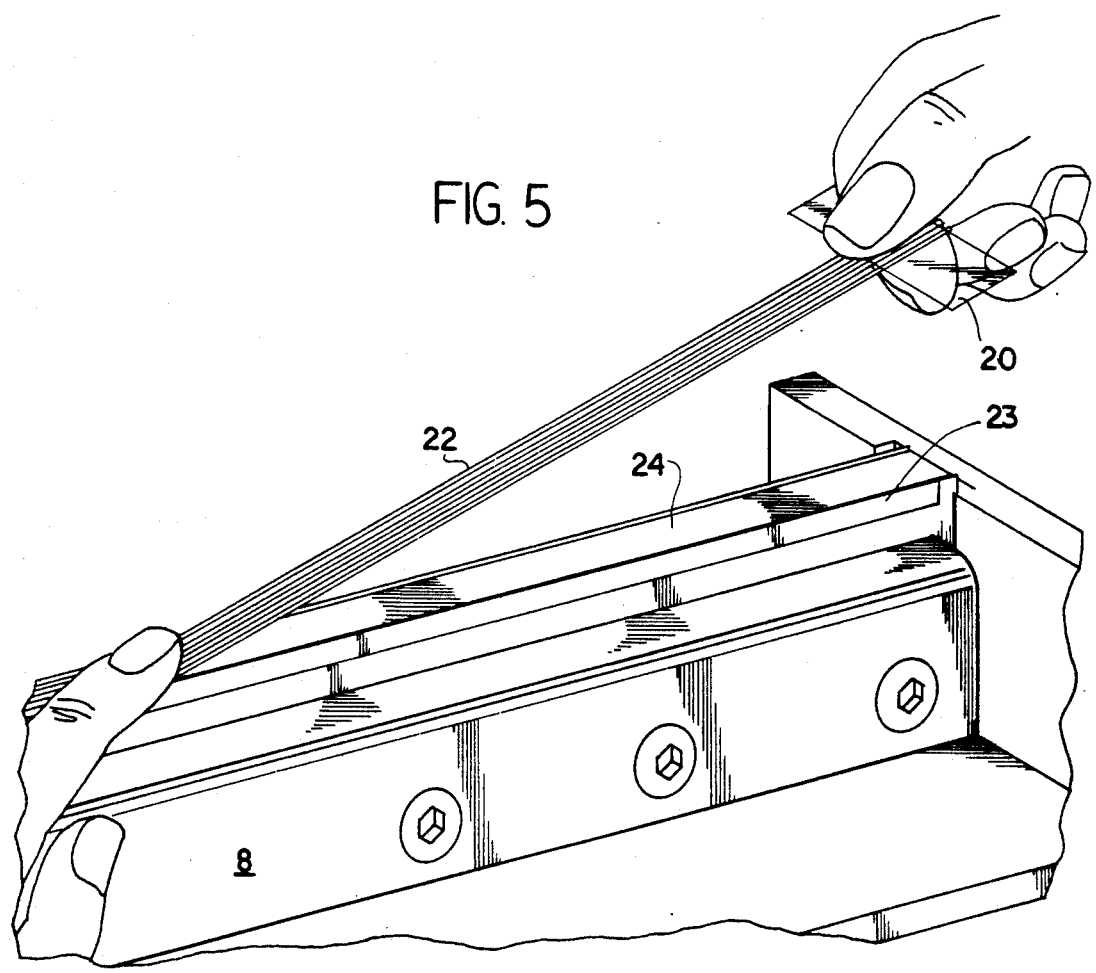

As shown in FIG. 5, to complete the ribbon assembly operation, a finger is placed on top of tape 20, optical fibers 15 are grasped firmly at the outside edge of block 10, and optical fibers 15 and tape 21 are gently pulled upward. As optical fibers 15 are pulled upward, tape 21 on the top of channel 24 separates at the top edges of sidewalls 12, 13 at the location of the forefinger. The forefinger is moved slowly down channel 24 towards block 9 as the now ribbonized fibers and ribbon 22 is pulled until the entire six inch section of ribbon 22 is clear of tool 6. Ribbon 22 is removed and tweezers are used to clear away excess tape 23, 20 from tool 6.

If desired, the coating from optical fibers 15 may be stripped and ribbon 22 may be spliced in a mass fusion splicer.

The tool is generally made of aluminum bar stock. Sidewalls 12, 13 may be 20.125 inch pieces of shim stock which are then bound to bar 8.

Another feature of the invention is that bar 8 rests in a padded slot in base 7 in order that bar 8 can be turned over to reveal a channel which is smaller but otherwise like channel 24 on the reverse side of bar 11. This feature allows the tool to be adaptable to make ribbons of two different widths.

What is claimed is:

1. A tool for fabricating a planar array of optical fibers to be held by adhesive tape, comprising:

a frame having a channel therein for holding parallel optical fibers, said channel set between a pair of rigid sidewalls extending slightly from the channel, said sidewalls being sufficiently narrow to sever adhesive tape to be placed on the optical fibers in the channel when said adhesive tape is pulled away from said sidewalls, and means for organizing optical fibers into a parallel array for placement into said channel.

* * * * *